Patented Sept. 24, 1940

2,215,849

UNITED STATES PATENT OFFICE 2,215,849

AMYLACEOUS REMOISTENING ADHESIVE

Hans F. Bauer, Chicago, Ill., assignor to Stein, Hall Manufacturing Company, Chicago, Ill., a corporation of Delaware No Drawing. Application May 4, 1939,
Serial No. 271,713

15 Claims. (Cl. 134—23.4)

This invention relates to new and improved adhesive compositions, more particularly amylaceous remoistening adhesives having slip characteristics, and a method for the preparation thereof.

By the term "amylaceous adhesives" is meant those types of adhesives which are prepared from starches and starch degradation products such as dextrines or starch gums. The term "remoistening adhesives" is used herein to describe those types of adhesives which are applied to paper or fabric or other surface in aqueous solution or suspension and dried to form a base material coated with a potentially adhesive film, which on being remoistened will immediately develop tackiness and act as a suitable adhesive for bonding the base material to other materials.

The expression "slip characteristics" is used herein to describe that quality or property of the adhesive which permits the paper or other base material to slide while the adhesive is still wet and after it is first applied to a surface. Proper "slip" is particularly important in connection with hanging wall paper, poster paper or other types of wall coverings where it is necessary to match designs or borders. "Slip" is also important in certain other adhesive applications, for example, the preparation of decalcomania papers.

Up to the present time, wall papers and other types of hanging papers have been hung by applying a paste thereto to form a wet coating on the back of the paper and then hanging the paper while the coating of adhesive is still wet. This type of paper hanging presents no special problems as to the adhesive used. Quite the reverse is true, however, where it is desired to provide a pre-gummed wall paper or other wall covering having a dried coating of adhesive thereon which requires only remoistening to be applied to a wall or other surface.

Many adhesives lose their adhesive properties after they have been dried and show no substantial adhesive power upon remoistening of the dried coating. This is typical, for example, of adhesives made from casein and other proteinous substances. Remoistening adhesives made from animal glue are too tacky upon being remoistened and do not have the necessary slip for making pre-gummed wall paper. Such adhesives are also objectionable because of odor.

Pressure sensitive adhesive such as those made from rubber latex likewise have no slip characteristics and are also objectionable in many instances because of the tendency of such materials to deteriorate.

Dextrine adhesives have been used for labels, stamp and envelope seals but the adhesives which have been used for such purposes suffer from certain disadvantages which make them unsuitable for use in making pre-gummed wall paper. For example, such adhesives have insufficient slip and insufficient adhesive power. Certain other types of amylaceous materials, particularly those of the starchier types, either have no substantial remoistening adhesive power or in the case of the starchier types of conversion products have a tendency to retrograde or become more insoluble and thereby lose their remoistening adhesive qualities on standing over an extended period of time.

Although the manufacturers of amylaceous adhesives and the manufacturers of gummed papers and fabric have had many years of experience in the use of remoistening adhesives for label, stamp and envelope work they have, up to the present time, been unable to develop an adhesive of the remoistening type which could be successfully used in making pre-gummed hanging papers. Lobdell, Reissue Patent No. 10,430 describes a wall paper which is dry sized on its back and according to the patent may be hung by moistening the sized surface and applying it to a wall. The sizing used is said to be dextrine, glue, paste or gums. As will be readily recognized from the previous discussion, no practical or suitable pre-gummed hanging paper has ever resulted from the teaching of the Lobdell patent because the problem of making a pre-gummed hanging paper is not so simple that it may be accomplished merely by adding an ordinary type of sizing material or glue to the back of the paper and drying it.

The difficulty of providing an adhesive for use in making pre-gummed hanging papers is increased by the numerous characteristics which the adhesive must possess. As already indicated, it must possess "slip characteristics" so that the paper will slide from place to place on the wall after it is moistened and while it is still wet. At the same time, the adhesive must develop sufficient adhesive power when the dried coating thereof is moistened so as to hold the paper or other base material against the wall in its wet state and after it has dried. Adhesive materials, and particularly amylaceous materials, have a tendency to crack, crystallize or chip off of base materials to which they are applied. This is undesirable and should be avoided. For the manufacture of pre-gummed hanging paper, the remoistening adhesive should be flexible. Many adhesives have a tendency to curl flexible materials such as paper. To be commercially satisfactory, a remoistening adhesive for pre-gummed hanging paper should not curl the paper. The adhesive must also be capable of being spread uniformly on the paper and must be of such character that it will dry and shrink evenly so as to shrink out any blisters or bulges which form on the surface of the paper. Very often in remoistening adhesive compositions some of the ingredients will tend to crystallize out or form crystals in the adhesive coating when the adhesive coating is dry. This, likewise, should be avoided.

Some remoistening adhesives have a tendency to be tacky under ordinary atmospheric conditions. Since the adhesive in a pre-gummed hanging paper is normally rolled into contact with the design or color on the face of the paper, it will at once be apparent that any tendency of the adhesive to stick to the front or face of the wall covering while it is in roll form would make it commercially worthless.

In view of the numerous problems involved, little progress has heretofore been made in the preparation of pre-gummed hanging papers or more specifically, in the preparation of pre-gummed wall papers. In my copending application, Serial No. 252,457, filed January 23, 1939, now Patent No. 2,183,532 of Dec. 19, 1939, which in turn is a continuation-in-part of my application Serial No. 168,360, filed October 11, 1937, I have described a new and improved type of pre-gummed hanging paper. The adhesive on said paper comprises a plurality of amylaceous substances of differing water absorptive capacities and a plasticizing agent having the property of increasing the fluidity of amylaceous dispersions. Such an adhesive has also been described in my application Serial No. 184,929, filed January 14, 1938.

One of the objects of the present invention is to provide an improved type of adhesive having the characteristics necessary for making a pre-gummed hanging paper and for other purposes requiring characteristics of the type previously mentioned without the necessity of using a plurality of amylaceous substances. Other objects of the invention will appear hereinafter.

It has now been found in accordance with the invention that an improved adhesive suitable for the manufacture of pre-gummed hanging paper and for other purposes may be made by using a specified type of degraded or modified amylaceous substance. This degraded or modified amylaceous substance for the purpose of this invention should have a solubility within the range of about .5% to about 30% in water at 75° F. and when mixed with proportions of water in the ratio of 10 parts of water to 1 part of amylaceous material should have a fluidity or viscosity characteristic within the range of 7 seconds to 200 seconds, as determined by the following test on a Stormer viscosimeter.

The number of seconds required for 100 revolutions of the Stormer viscosimeter cup containing a given sample of material at 75° F., using a 100 gram weight is determined. The sample of amylaceous material to be tested is made up by heating 1 part of said material in 10 parts of water to a temperature of 185° F. until a homogeneous dispersion is obtained, then cooling to 75° F. The viscosimeter cylinder used in testing the amylaceous substances hereinafter referred to required 2.8 seconds for 100 revolutions running free, using a 100 gram weight, and 5.9 seconds with water at 75° F. This test is herein referred to as the "viscosity test for degraded amylaceous substances".

In practicing the invention, it has been found that amylaceous degradation products of the character described when dispersed with a plasticizing agent capable of increasing the fluidity of aqueous amylaceous dispersions are excellent adhesives for the manufacture of pre-gummed hanging papers. Pre-gummed hanging papers made up with adhesive compositions of this type have sufficient adhesive power to adhere to plane surfaces when the adhesive coating is moistened. At the same time they have excellent slip characteristics and may be moved from one point to another after the dried coating of adhesive is remoistened while the adhesive is still wet and after it is first applied to a surface. Furthermore, blisters, bulges, wrinkles and the like which sometimes form when a hanging paper such as a wall paper is applied in the wet state shrink out or disappear in pre-gummed hanging papers of the type herein described as the paper dries. Another important feature of the pre-gummed hanging papers made in accordance with this invention is to be found in the fact that the dried adhesive coating does not tend to become tacky and cause the paper to stick together when rolled in the usual manner, nor does the adhesive coating tend to crack or cause the paper to curl when it is properly applied to the paper.

For the purpose of this invention, it is preferable that the total solid content of the adhesive before it is applied to the paper or other base material be such that not less than about 1 part of water and not more than about 5 parts of water per part of solids is required to give a viscosity within the range of about 40 seconds to about 180 seconds at 75° F. using a 1000 gram weight in the above mentioned viscosity test instead of a 100 gram weight. This test is referred to herein as the "adhesive composition" viscosity test. By total solids content is meant the amylaceous material plus plasticizing agents and any other normally solid materials that may be employed.

The ratio of solids to water should preferably not be less than about 1:1 using an amylaceous degradation product of the type herein referred to, or otherwise the adhesive character of the coating will not be sufficient upon remoistening to give the required slip characteristics. On the other hand, if the ratio of water to solids is greater than about 5:1, the amount of drying required in order to properly apply the adhesive to the paper or other material which is to be coated will normally be prohibitive.

In the coating operation the coating weight is always important because it determines the amount of adhesive material actually on the paper. If this amount is too great, it may cause the adhesive to crack or check. If it is too small, the adhesive will not have the necessary strength to hold the paper on the wall or other surface to which it is applied. Generally speaking, for the purpose of this invention the amount of water required will preferably be about 2 to 3 parts of water per part of solids in order to apply the adhesive to the paper or other base material at a suitable or proper coating weight.

The plasticizing agent preferably employed in accordance with this invention in order to prepare the adhesive is a normally solid substance or a plurality of normally solid substances that exert a solubilizing influence on amylaceous degradation products. "Degraded amylaceous materials" or "amylaceous degradation products" as the expressions are used herein, cover dextrinized starches and modified starches. A dextrinized starch is a starch which has been converted either in the wet or dry state in the presence of an acid or an acid reacting substance. If converted in the dry state, it is referred to herein as a dry converted dextrinized starch. A modified starch is a starch which generally retains its starch structure but has been chemically treated or treated in some other manner, for example, by means of enzymes, so as to break down or modify this starch structure. For example, chlorinated starches and thin boiling starches may be called modified starches.

A raw or undegraded starch alone is unsuitable for the purpose of this invention for several reasons, one of which is to be found in the fact that this type of starch requires too much water for the proper dispersion. On the other hand, certain types of starch degradation products, as, for example, those containing relatively large amounts of dextrine, are also unsuitable for use alone in the preparation of pre-gummed hanging papers in accordance with this invention, largely due to the fact that these products are too tacky when formed into a dried coating and then remoistened.

The adhesive may be prepared by dispersing the ingredients, namely, the degraded amylaceous substance, plasticizing agents and any other auxiliary materials in a dispersion medium such as water in sufficient amount to give the mixture a fluidity corresponding to that mentioned above so that it may be suitably spread or coated upon the paper. The resultant composition is then applied to the paper by any suitable method of surface coating involving the use of a doctor blade or other means such as are well known to those skilled in the coating art, and the paper is then dried or allowed to dry. The coating weight will vary depending upon the composition of the adhesive, the speed and method of applying, and also upon the type of material treated. With ordinary wall papers good results may be obtained by the use of 2 grams or less (e. g., say about 1.2 grams) of adhesive per square foot of wall paper, calculated on the weight of the dried adhesive coating. For some base materials, as low as 0.5 gram of dried adhesive per square foot may be used while for others it may be desirable to use as high as 5 grams per square foot.

The invention will be further illustrated but is not limited by the following examples in which the quantities are stated in parts by weight unless otherwise indicated.

*Example I*

A starch conversion product was prepared by converting a high grade wheat starch for 1 hour at 280° F. This conversion was carried out in a substantially dry state, using 2½ lbs. of 18° Bé. hydrochloric acid to 1000 lbs. of wheat starch. The acid was diluted to 6° Bé. before being added to the wheat starch. After being converted 1 hour at 280° F. the conversion product was removed and was found to be 6.4% soluble in water at 75° F. This product when tested at 75° F. with 10 parts of water per part of said product on a Stormer viscosimeter using a 100 gram weight in the manner previously described gave a viscosity test of 11 seconds in 100 revolutions of the viscosimeter cylinder.

The conversion product thus prepared was mixed with a composition having the following ingredients:

| | Parts |
|---|---|
| Urea | 25 |
| Sodium acetate | 10 |
| 75% sulfonated castor oil | 1.75 |

These ingredients were blended together dry and then mixed with the starch conversion product in the ratio of 35 lbs. to 65 lbs. of the conversion product. The resultant blend was then blended with 1¼ parts of water per part of blend and this mixture was heated to 185° F. until clear.

It was coated on the back of wall paper in a thin film which was allowed to dry. Wall paper thus prepared was non-curling, non-cracking, flexible and the adhesive was non-tacky under ordinary atmospheric conditions. When this adhesive is moistened, the paper possesses excellent slip characteristics so that it will slide from one place to another after it has been applied to a wall and before the adhesive has dried substantially. At the same time, it possesses sufficient re-tack power to hold it to the wall. Blisters, wrinkles and the like which sometimes form in the paper when it is applied readily shrink out when the paper dries on the wall.

In this example the amount of sodium acetate may be increased to 15% or decreased to 5%, the amount of urea being correspondingly decreased or increased.

*Example II*

A wheat starch conversion product was prepared from a lower grade wheat starch known as No. 25, the conversion conditions being otherwise the same as for the wheat starch conversion in Example I. This conversion product had a solubility of 2.6% in water at 75° F. and a Stormer viscosity as determined in the manner previously described at 75° F., with a 100 gram weight of 17.2 seconds in 100 revolutions of the cylinder. Sixty-five parts of this conversion product were blended with 35 parts of a plasticizing composition made up of 25 parts urea, 10 parts sodium acetate and 1¾ parts of 75% sulfonated castor oil. This blend was then mixed with 2 parts of water per part of blend and the mixture heated, while stirring, to 185° F. until clear. The resultant composition had a viscosity characteristic of 72 seconds as determined on a Stormer viscosimeter at 75° F. using a 1000 gram weight for 100 revolutions of the cylinder.

This adhesive composition when applied to the back of wall paper to form a pre-gummed wall paper gave excellent results similar to those described in Example I.

*Example III*

The procedure in this example was the same as in Example I except that the starch conversion product was made from a low grade wheat starch known as No. 50. This conversion product had a solubility of 4.4% at 75° F. and a Stormer viscosity in 10 parts of water per part of said product at 75° F. of 19 seconds using a 100 gram weight according to the test previously described.

A blend of 65 lbs. of this product with 35 lbs. of a plasticizing composition containing 25% urea, 10% sodium acetate and 1¾% of 75% sulfonated castor oil when mixed with 2½ parts of water per part of blend and heated to 185° F. until clear gave an excellent adhesive composition for the preparation of pre-gummed hanging paper. This adhesive composition at 75° F. using a 1000 gram weight with a Stormer viscosimeter gave a fluidity or viscosity corresponding to 70 seconds for 100 revolutions of the viscosimeter cylinder.

Excellent results were obtained when this composition was employed to form pre-gummed hanging paper.

Example IV

In Example I, the conversion product was obtained from practically 100% pure wheat starch from which substantially all of the gluten had been removed. In Example II, the conversion product was obtained from a somewhat lower grade of wheat starch, while in Example III a still lower grade of wheat starch was used containing gluten in dispersed form. According to the present example the material used as a starting material was wheat flour in which the gluten was rendered inert by the following conversions. This was converted for 1 hour with sodium bisulfite using about 2 lbs. of sodium bi-sulfite to 1200 lbs. of flour at a temperature of about 225° F., then there was added 50 lbs. of boric acid and 3 lbs. of 18° Bé. hydrochloric acid diluted to 6° Bé. hydrochloric acid and the temperature was raised to 280° F. for 1½ hours to 2 hours more. The conversion product obtained had a solubility within the range of 8% to 12% at about 75° F. and gave a Stormer viscosity test in 10 parts of water per part of said product when tested with a 100 gram weight in the manner previously described of 14 seconds at 75° F.

This conversion product also formed an excellent adhesive for the preparation of pre-gummed hanging paper when mixed with about 4 parts of water per part of conversion product and blended with urea and sodium acetate in the proportion of about 65 parts of conversion product, 25 parts of urea and 10 parts sodium acetate with the addition of about 1¾ parts of 75% sulfonated castor oil.

Example V

A rice starch conversion product was prepared by adding to 1000 lbs. of rice 3 lbs. of 18° Bé. hydrochloric acid which was diluted to 6° Bé. and converted at 280° F. for about 2½ hours. This conversion product had a solubility of 1% in water at about 75° F. and gave a Stormer viscosity test in 10 parts of water per part of conversion product of 29.5 seconds using a 100 gram weight according to the test procedure previously described.

This conversion product was blended with urea, sodium acetate and sulfonated castor oil in the proportions of 65 parts conversion product, 25 parts urea, 10 parts sodium acetate and 1¾ parts 75% sulfonated castor oil and the blend mixed with water in proportions of 3 parts of water to 1 part of blend and heated to 185° F. until clear. The resultant composition gave a viscosity test on a Stormer viscosimeter of 97 seconds using a 1000 gram weight for 100 revolutions of the cylinder at 75° F.

Excellent results were obtained in the preparation of pre-gummed hanging papers with this adhesive composition.

Example VI

Similarly good results were obtained using a rice starch conversion product prepared as in Example V except that the time of conversion was 3½ hours and the solubility was 1.6% in water at 75° F. The stormer viscosity of this conversion product using 10 parts of water per part of conversion product and a 100 gram weight at 75° F. according to the procedure previously described, was about 23 seconds.

This conversion product was mixed with a plasticizing composition containing 25 parts urea, 10 parts sodium acetate and 1¾ parts of 75% sulfonated castor oil, the proportions of plasticizing agent to conversion product being 35 lbs. to 65 lbs. The resultant blend when mixed with 3 parts of water per part of blend and heated to 180° F. formed an excellent adhesive for the manufacture of pre-gummed hanging materials and had a viscosity of 70 seconds as determined on a Stormer viscosimeter for 100 revolutions of the viscosimeter cylinder using a 1000 gram weight at 75° F.

Example VII

A rice starch conversion product was formed according to the general methods of Examples V and VI except that the time of conversion was 4½ hours and the conversion product had a solubility of 9.2% at 75° F. with a viscosity characteristic of 8.5 seconds when tested with 10 parts of water per part of conversion product on a Stormer viscosimeter at 75° F. in the manner previously described. This product was blended with a plasticizing composition made up of 25 parts urea, 10 parts sodium acetate, and 1¾ parts of sulfonated castor oil, the proportions being such that the total blend consisted of 65% rice conversion product and 35% of the plasticizing composition. This blend was then mixed with 1½ parts of water per part of blend and heated to 185° F. This composition showed a viscosity characteristic of 106 seconds as determined on a Stormer viscosimeter for 100 revolutions of the viscosimeter cylinder at 75° F. using a 1000 gram weight.

Excellent results were obtained with this composition in the preparation of pre-gummed hanging papers of various types including wall paper, poster paper bill board paper, etc.

Example VIII

In this example the degraded amylaceous substance employed was a No. 90 thin boiling starch, a type of starch well known in the trade, made by the wet conversion of corn. This starch had a solubility in water at 75° F. of about 15% and a fluidity or viscosity characteristic of 10.5 seconds when tested on a Stormer viscosimeter in 10 parts of water per part of starch at 75° F. according to the test previously given. Sixty-five lbs. of this starch were blended with 35 lbs. of a plasticizing composition made up of 25 parts urea, 10 parts sodium acetate and 1¾ parts sulfonated castor oil. This blend was then mixed with 1½ parts water per part of blend and heated to 185° F. The resultant adhesive composition had a viscosity characteristic of 70 seconds when tested on a Stormer viscosimeter at 75° F. using a 1000 gram weight. Good results were obtained in the use of this composition for the preparation of pre-gummed wall paper.

Example IX

A chlorinated starch sold under the trade name of Hercules and having a solubility of 1.8% in water at 75° F. and a Stormer viscosity of 11.2 seconds when tested in 10 parts of water to 1 part of starch at 75° F., according to the method previously given, was blended with a plasticizing composition in the ratio of 65% of starch to 35% of the plasticizing composition. This plasticizing composition contained 25 parts urea, 10 parts sodium acetate and 1¾ parts sulfonated castor oil. The blend, when mixed with 1½ parts of water per part of blend and heated to 185° F. gave an adhesive composition which on cooling to 75° F. and testing in a Stormer viscosimeter had a fluidity or viscosity characteristic of 89 seconds for 100 revolutions of the viscosimeter cylinder using a 1000 gram weight. Good results were obtained in the use of this composition for the preparation of pre-gummed wall paper.

*Example X*

In this example, the conversion product was a corn starch conversion product having a solubility of about 4.2% and a Stormer viscosity characteristic of 16 seconds at 75° F. when tested with 10 parts of water per part of conversion product according to the viscosity test for degraded amylaceous substances previously described. This conversion product was blended with a plasticizing composition to produce a blend containing 65% conversion product and 35% of the plasticizing composition. The plasticizing composition contained 25 parts urea, 10 parts sodium acetate and 1¾ parts 75% sulfonated castor oil. This blend was then mixed with 1¾ parts water per part of blend and heated to 185° F. until clear. The resultant composition had a viscosity or a fluidity characteristic of 70 seconds when tested on a Stormer viscosimeter at 75° F. using a 1000 gram weight.

This product also is suitable for use in the preparation of pre-gummed hanging papers.

In a similar manner other types of degraded amylaceous substances may be employed for the preparation of pre-gummed hanging papers provided they fall within the general range of solubilities and viscosity previously mentioned. For example, a No. 75 thin boiling starch can be employed which has a solubility of about .8% in water at about 75° F. and a Stormer viscosity of about 193.5 seconds when tested in 10 parts of water per part of starch according to the test herein given using a 100 gram weight. This starch degradation product starch represents approximately the starchiest type of material which can be used as the sole amylaceous substance in order to obtain suitable results for the purpose of the present invention. Thus, a No. 60 thin boiling starch is too starchy in its nature and requires too much water in order to be practical for the purpose of this invention. On the other hand, certain types of dextrines having a solubility of say 75% to 80% or more contain too much dextrine and do not have the proper solubility and fluidity or viscosity characteristics for the preparation of a pre-gummed wall paper as provided by this invention. Thus, it will be seen that the invention is confined to a specific range of amylaceous degradation products. It will be understood of course that these products may be blended with other types of amylaceous products or other materials than those specifically described herein, but one of the advantages of the present invention is to be found in the fact that it is no longer necessary to use a blend of amylaceous materials.

This invention is not limited to any particular type of amylaceous degradation product and the starchy materials from which these products are derived may be, for example, wheat, rice, barley, corn, rye, tapioca, potato and other types of starches. In carrying out this invention, however, it has been found that certain types of starch degradation products within the limits defined give outstanding results as compared with others. Among the starch degradation products which are particularly desirable are those derived from wheat and rice because these conversion products within the limits defined herein form softer pastes which do not tend to gel as distinguished, for example, from certain other grain starches, such as corn, which can be used, although it is less desirable. With wheat and rice starches, the preferred amylaceous degradation products have a solubility within the range of about 1% to about 25% and a viscosity characteristic within the range of about 8 seconds to about 30 seconds, as determined by the viscosity test for degraded amylaceous substances herein described. Likewise, degraded tuber starches such as tapioca and potato within the defined limits can be used but are less desirable because the adhesives made from them are tackier than the grain starch degradation products. This tackiness is offset to a considerable extent by salts of aliphatic carboxylic acids such as sodium acetate which imparts slip to the adhesive.

It will be understood that variations may be made in the composition of the adhesive, in the method of applying the adhesive to the base material and in the various types of base materials to which it is applied. Many wall papers are unsized or contain very little sizing, while poster papers and bill board papers are often highly sized and the type of adhesive within the range specified herein may vary depending upon the sizing and other factors related to the use of a particular base material.

The plasticizing agent employed is preferably a normally solid material which has the property of increasing the fluidity of dispersions of degraded amylaceous substances. Urea and alkali metal acetates both have this property and in the examples the urea may be used without the alkali metal acetate, or vice versa, but the combination of both appears to give results which are more than merely additive. Furthermore, the combination of both together apparently tends to prevent curling of the paper. Urea is practically neutral in aqueous solution and sodium acetate in water ordinarily has a pH from 7 to 8 so that neither compound is injurious to the paper. Urea and/or sodium acetate may be replaced at least in part by other substances which are not injurious to the paper and which have a solubilizing or dispersing action on starch degradation products, as, for example, the water soluble analogues and homologues of urea, including thiourea, other alkali metal acetates such as potassium acetate, other salts of aliphatic carboxylic acids such as sodium propionate and other propionates, and many other materials such, for example, as resorcinol, chloral hydrate, sodium salicylate, calcium chloride, zinc chloride, magnesium chloride, water soluble thiocyanates, including potassium thiocyanate, sodium thiocyanate and ammonium thiocyanate, and water soluble nitrates, including sodium nitrate, potassium nitrate, ammonium nitrate and guanidine nitrate. Some compounds such as those of phenolic nature, however, sometimes suffer from the disadvantage that they tend to turn dark. The compound or compounds chosen should preferably be normally solid at ordinary temperatures since the presence of a liquid compound might tend to make the paper stick together when rolled. It is also preferable that the compound chosen be such that the pH value of the adhesive under the conditions used can be within the range of about 5 to about 9. Bleaching agents may be added, for example, sodium bisulfite or sodium hydrosulfite. Fillers may also be used to give body to the adhesive composition.

If either the urea or sodium acetate is omitted, the proportion of the ingredient retained is preferably correspondingly increased. In addition to its advantages in preventing curling of the paper, sodium acetate also produces a clear film and tends to prevent or inhibit crystallization of urea in the film so that the final appearance of the paper is such that the adhesive is not readily visible to the casual observer.

The amount of solubilizing or dispersing agent, as already indicated, should preferably be such that the composition will spread evenly and uniformly upon the addition of about 1 to about 5 parts of water per part of blended solid ingredients. The presence of too much urea is to be avoided because of a tendency to make the composition hygroscopic. This tendency is less marked with sodium acetate. Generally speaking, of the total solids content, a major portion should be formed by the amylaceous degradation product and the total amount of plasticizing composition should not be greater than about 45% of the total solids. Thus, the total amount of urea and sodium acetate is preferably not greater than about 45% of the total solids preferably within the range of 20% to 45%. The minimum amount of sodium acetate is preferably about 5% and the maximum about 30% of the total solids. The minimum amount of urea is preferably about 5% and the maximum about 40% of the total solids.

In some instances it may be desirable to add an acid, preferably in amounts just sufficient to neutralize any ammonia which may be formed. For this purpose very small quantities of acid are required, being in the neighborhood of around 2% or less. Acids which are normally solid at ordinary temperatures are preferred, for example, citric acid, tartaric acid, malic acid, boric acid and the like.

The sodium acetate employed may be granular or powdered sodium acetate, either 60%, 90% or anhydrous, the first mentioned being preferred. Sodium diacetate having available acetic acid of from 25% to 35% may also be used.

The mixing of the various ingredients of the adhesive compositions and the temperature of heating may vary, but ordinarily it will be sufficient to heat the mixture within the range of about 140° F. to about 185° F. until a uniform homogeneous dispersion is obtained.

The expression "water soluble urea" as employed herein is intended to include and cover urea and its water soluble analogues and homologues, including thiourea, monomethyl urea, monoethyl urea, dimethyl urea and higher water soluble homologues or analogues which have the property of increasing the fluidity of aqueous amylaceous dispersions. The expression "lower aliphatic carboxylic acid" is intended to cover members of the fatty acid series which are substantially soluble in water.

The adhesives made in accordance with this invention after being applied as a coating and dried, upon being moistened have the desired slip characteristics. This invention makes possible the preparation of adhesives suitable for making pre-gummed hanging papers in a simpler manner than it has heretofore been possible to make such materials. At the same time, this is accomplished while producing adhesives having all of the desirable characteristics of freedom from tack and stickiness in the dry state, freedom from cracking, checking and curling. The amount of water present initially in the adhesive when it is applied is such that it does not tend to destroy paper and other more or less absorbent materials. Moreover, the adhesive is weakly acid, substantially neutral or mildly alkaline, and the ingredients thereof do not tend to injure paper or the like. The adhesive, furthermore, does not tend to lose its adhesive characteristics over long periods of time, that is to say, the adhesive retains its remoistening adhesive properties when a dried coating thereof is moistened with water, even though the dried coating had been allowed to stand for a considerable length of time.

It will be understood that variations may be made in the composition of the adhesive and in the paper or other base material to which it is applied without departing from the invention, and that in carrying out the invention, other variations, modifications and equivalents may be employed. Thus, the base material, instead of being paper, may be a canvas wall covering, or a thin wooden panel, or some other type of fibrous wall covering in which proper slip characteristics of the adhesive are essential to match patterns. Likewise, the adhesive compositions of this invention are extremely useful in making decalcomania papers.

Having thus described the invention, what I claim as new and desire to secure by Letters Pattent of the United States is:

1. A remoistening adhesive formed from an incompletely dextrinized wheat starch having a solubility in water at 75° F. from about 1% to about 25% and a viscosity characteristic within the range of about 8 seconds to about 30 seconds as determined by the viscosity test for degraded amylaceous substances herein described, intimately dispersed with urea and sodium acetate, the dextrinized wheat starch forming a major part of the adhesive, the total amount of urea and sodium acetate being about 20% to about 45% by weight of the total solids, the minimum and maximum amounts of sodium acetate being about 5% and about 30%, respectively, and the minimum and maximum amounts of urea being about 5% and 40%, respectively, on the basis of the total solids, said adhesive also containing a small amount of sulfonated oil on the basis of the normally solid ingredients.

2. A remoistening adhesive formed from an incompletely dextrinized wheat starch having a solubility in water at 75° F. from about 1% to 25% and a viscosity characteristic within the range of about 8 seconds to about 30 seconds, as determined by the viscosity test for degraded amylaceous substances herein described, intimately dispersed with ureau and an alkali metal acetate, the dextrinized wheat starch forming a major part of the adhesive, the total amount of urea and alkali metal acetate being about 20% to 45% by weight of the total solids, the minimum and maximum amounts of alkali metal acetate being about 5% and about 30%, respectively, and the minimum and maximum amounts of urea being about 5% and about 40%, respectively, on the basis of total solids.

3. An adhesive formed from an incompletely dextrinized wheat starch having a solubility in water at 75° F. from about 1% to about 25% and a viscosity characteristic within the range of about 8 seconds to about 30 seconds, as determined by the viscosity test for degraded amylaceous substances herein described, intimately dispersed with a water soluble urea and an alkali metal acetate, the total amount of the urea and alkali metal acetate being not more than about 45% by weight of the total solids, the minimum and maximum amounts of alkali metal acetate being about 5% and about 30%, respectively, and the minimum and maximum amounts of urea being about 5% and about 40%, respectively, on the basis of the total solids, said ingredients being present in such proportions that a dried coating of said adhesive when moistened possesses retack properties and slip characteristics.

4. An adhesive formed from an incompletely dextrinized rice starch having a solubility in water at 75° F. from about 1% to about 25% and a viscosity characteristic within the range of about 8 seconds to 30 seconds, as determined by the viscosity test for degraded amylaceous substances herein described, intimately dispersed with a water soluble urea and an alkali metal acetate, the total amount of the urea and alkali metal acetate being about 20% to about 45% by weight of the total solids, the minimum and maximum amounts of alkali metal acetate being about 5% and about 30%, respectively, and the minimum and maximum amounts of the urea being about 5% and about 40%, respectively, on the basis of the total solids.

5. An adhesive formed from a degraded grain starch having a solubility in water at 75° F. within the range of about .5% to about 30%, and a viscosity characteristic within the range of about 7 seconds to 200 seconds, as determined by the viscosity test for degraded amylaceous substances herein described, intimately dispersed with a water soluble urea and an alkali metal acetate, the total amount of the urea and the alkali metal acetate being not more than about 45% by weight of the total solids, the minimum and maximum amounts of alkali metal acetate being about 5% and about 30%, respectively, and the minimum and maximum amounts of the urea being about 5% and about 40%, respectively, on the basis of the total solids, said ingredients being present in such proportions that a dried coating of said adhesive when moistened possesses retack properties and slip characteristics permitting a material coated with said adhesive to slide while the adhesive is wet.

6. An adhesive formed from a degraded amylaceous substance having a solubility in water at 75° F. from about .5% to about 30% and a viscosity characteristic within the range of about 7 to about 200 seconds, as determined by the viscosity test for degraded amylaceous substances herein described, intimately dispersed with a water soluble urea and a soluble salt of a lower aliphatic carboxylic acid, the total amount of the urea and said salt being not more than about 45% by weight of the total solids, the minimum and maximum amounts of said salt being about 5% and about 30%, respectively, and the minimum and maximum amounts of the urea being about 5% and about 40%, respectively, on the basis of total solids, said ingredients being present in such proportions that a dried coating of said adhesive when moistened possesses retack properties and slip characteristics permitting the adhesive coating to slide against a surface while it is still wet after it is first moistened and applied to said surface.

7. An adhesive formed from a degraded amylaceous substance having a solubility in water at 75° F. from about 0.5% to about 30% and a viscosity characteristic within the range of about 7 to about 200 seconds, as determined by the viscosity test for degraded amylaceous substances herein described, intimately dispersed in water with a plasticizing agent of which about 5% to about 40% is a water soluble urea, the total amount of plasticizing agent being not more than about 45% by weight of the total solids, and the amount of water being within the weight ration of water to solids from about 1:1 to about 5:1.

8. An adhesive formed from a degraded amylaceous substance having a solubility in water at 75° F. from about 0.5% to about 30% and a viscosity characteristic within the range of about 7 to about 200 seconds, as determined by the viscosity test for degraded amylaceous substances herein described, intimately dispersed in water with a plasticizing agent of which about 5% to about 30% is a water soluble salt of a lower aliphatic carboxylic acid, the total amount of plasticizing agent being not more than about 45% by weight of the total solids, and the amount of water being within the weight ratio of water to solids from about 1:1 to about 5:1.

9. An adhesive formed from a degraded amylaceous substance having a solubility in water at 75° F. from about 0.5% to about 30% and a viscosity characteristic within the range of about 7 to about 200 seconds, as determined by the viscosity test for degraded amylaceous substances herein described, intimately dispersed in water with a plasticizing agent having a solubilizing action on degraded amylaceous substances of which about 5% to about 40% is a water soluble urea, the total amount of plasticizing agent being not more than about 45% by weight of the total solids, and the amount of water being within the weight ratio of water to solids from about 1:1 to about 5:1.

10. An adhesive formed from a degraded amylaceous substance having a solubility in water at 75° F. from about .5% to about 30% and a viscosity characteristic within the range of about 7 seconds to about 200 seconds, as determined by the viscosity test for degraded amylaceous substances herein described, intimately dispersed with a substantial quantity of a substantially neutral, normally solid compound having a solubilizing action on said degraded amylaceous substance and a substantial quantity of an alkali metal acetate, said ingredients being present in such proportions that said adhesive forms a coating which when moistened possesses retack properties and slip characteristics.

11. An adhesive formed from a degraded amylaceous substance having a solubility in water at 75° F. within the range of about .5% to about 30% and a viscosity characteristic within the range of about 7 seconds to about 200 seconds, as determined by the viscosity test for degraded amylaceous substance herein described, intimately associated with a substantial quantity of at least one normally solid compound having a solubility action on degraded amylaceous substances, the proportions of said ingredients being such as to produce an adhesive which after being dried in the form of a coating is capable of being remoistened and possesses retack properties and slip characteristics permitting material to which the adhesive is applied in the form of a dried coating to be moved after the adhesive has been moistened and first applied to a plane surface while the adhesive is still wet.

12. An adhesive formed from a degraded amylaceous substance having a solubility in water at 75° F. within the range of about 0.5% to about 30% and a viscosity characteristic within the range of about 7 seconds to about 200 seconds, as as determined by the viscosity test for degraded amylaceous substances herein described, intimately dispersed in water with a substantial quantity of at least one normally solid compound having a solubilizing action on degraded amylaceous substances, the weight ratio of water to solids being within the range of 1:1 to 5:1, the proportions of said ingredients being such that a dried coating of said adhesive upon being remoistened possesses retack properties and slip characteristics.

13. A remoistening adhesive formed from a degraded amylaceous substance having a solubility in water at 75° F. from about .5% to about 30% and a viscosity characteristic within the range of about 7 seconds to about 200 seconds, as determined by the viscosity test for degraded amylaceous substances herein described, intimately dispersed and associated with a substantial quantity of at least one plasticizing agent which has the property of increasing the fluidity of aqueous amylaceous compositions, said adhesive having a pH within the range from about 5 to about 9, and said ingredients being present in such proportions that a dried coating of said adhesive when moistened possesses retack properties sufficient to cause a material to which said coating is applied to adhere to a plane surface while permitting said material to slide on said surface while the adhesive is still wet after it is first moistened.

14. An adhesive formed from a degraded amylaceous substance having a solubility in water at 75° F. from about .5% to about 30% and a viscosity characteristic within the range of 7 seconds to about 200 seconds as determined by the viscosity test for degraded amylaceous substances herein described, intimately dispersed in water in a weight ratio of water to solids within the ration of 1:1 to 5:1 and associated with a substantial quantity of at least one plasticizing agent which has the property of increasing the fluidity of dipersions of degraded amylaceous substances, said ingredients being present in such proportions that said adhesive in the form of a dried coating when moistened possesses retack properties and slip characteristics.

15. A remoistening adhesive formed from a degraded amylaceous substance having a solubility in water at 75° F. from about .5% to about 30% and a viscosity characteristic within the range of 7 seconds to about 200 seconds as determined by the viscosity test for degraded amylaceous substances herein described, intimately dispersed and associated with a substantial quantity of at least one plasticizing agent which has the property of increasing the fluidity of dispersions of degraded amylaceous substances, said ingredients being present in such proportions that said adhesive in the form of a dried coating when moistened possesses retack properties and slip characteristics.

HANS F. BAUER.

CERTIFICATE OF CORRECTION.

Patent No. 2,215,849.                                September 24, 1940.

HANS F. BAUER.

It is hereby certified that error appears in the printed specification of the above numbered patent requiring correction as follows: Page 3, first column, line 52, for the word "same" read --some--; page 4, second column, line 43, after "paper" first occurrence, insert a comma; page 6, second column, line 63, claim 2, for "ureau" read --urea--; page 8, second column, line 12, for "ration" read --ratio--; and that the said Letters Patent should be read with this correction therein that the same may conform to the record of the case in the Patent Office.

Signed and sealed this 19th day of November, A. D. 1940.

(Seal)

Henry Van Arsdale,
Acting Commissioner of Patents.